March 24, 1931.  J. WAHL ET AL  1,797,383
COUPLING
Original Filed Nov. 24, 1926

INVENTORS:
John Wahl and
Otto Melzer,
By Attorneys,
Fraser, Myers & Manley.

Patented Mar. 24, 1931

1,797,383

UNITED STATES PATENT OFFICE

JOHN WAHL AND OTTO MELZER, OF NEW YORK, N. Y., ASSIGNORS TO A. SCHRADER'S SON, INCORPORATED, OF NEW YORK, N. Y., A CORPORATION OF NEW YORK

COUPLING

Original application filed November 24, 1926, Serial No. 150,504. Divided and this application filed December 10, 1927. Serial No. 239,067.

This invention relates to improvements in couplings for tire valve stems or the like, and constitutes a division of our application Serial No. 150,504, filed November 24, 1926, now Patent Number 1,657,874, granted Jan. 31, 1928.

According to the present invention we provide an improved coupling designed for quick detachable engagement with a tire valve stem or the like, and one so constructed as to always insure a leak-tight seal with the end of such valve stem.

A preferred embodiment of our invention is shown in the accompanying drawings, wherein—

Figure 1:
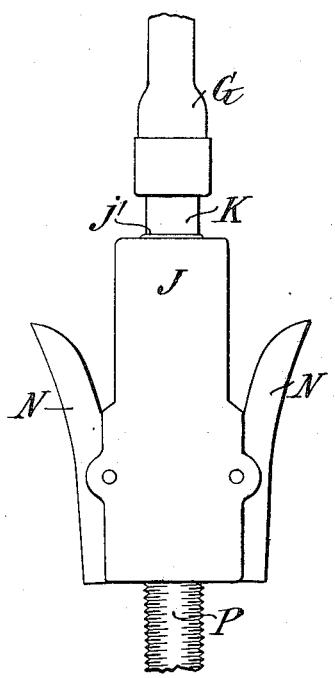
Figure 1 is an elevation of a coupling attached to a valve stem.
Figure 2:
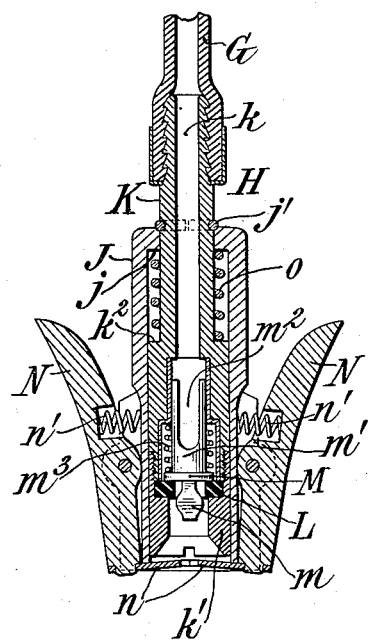
Fig. 2 is a longitudinal diametrical section of the coupling.

Referring to the drawings, G indicates a flexible conduit leading from a source of fluid under compression or a suction device, said conduit G connecting at its other end with a coupling device indicated as a whole by the letter H. The coupling H consists of a substantially cylindrical housing J having a bore therethrough within which is axially movable a tubular member K, one end $k$ of which is formed for engagement with the conduit G, and the other end $k'$ of which is designed for engagement with a tire valve stem. Within the end $k'$ of the tubular member there is mounted a disk packing L upon which seats a disk valve M provided on one side with a depending tire valve unseating pin $m$, and on its opposite side with a guiding stud $m'$, which stud has a lateral passage $m^2$ adapted to establish communication between opposite ends of the tubular member when the valve M therein is unseated. The valve M is maintained normally seated on the packing L by a spring $m^3$. This spring is employed only when the coupling is designed for use with a source of suction, in which event the tension of the spring $m^3$ is slightly greater than the suction effect operating to unseat the valve M. Obviously, when the coupling is connected with a source of compressed air, the spring $m^3$ may be omitted.

Pivotally mounted upon the housing J are a pair of arms N, the lower ends of which carry a pair of jaws $n$ which are normally urged toward each other and into engagement with the end of a tire valve P by coil springs $n'$ positioned between the housing and said arms, said jaws $n$ being movable outwardly against the tension of said springs by pressing the top ends of the arms N toward each other. Between a shoulder $j$ within the housing J, and a shoulder $k^2$ on the member K, there is positioned a coil spring O normally urging the member K toward the tire valve engaging end of the coupling to insure a leak-tight joint between the packing L and the top of the tire valve stem when the coupling is attached thereto. Movement of the member K toward the tire valve engaging end of the coupling is limited by the engagement with the top of the housing J of a split spring ring $j'$ mounted in a groove on the member K. It will be noted that the housing J is mounted to swivel on the member K and thus facilitate the manipulation of the coupling.

From the foregoing description the operation of the coupling will be apparent. It will also be understood that while we have shown and described a preferred embodiment of our invention, we do not wish to be limited thereto, since various changes may be made therein without departing from the spirit of the invention.

We claim as our invention:

1. A coupling for tire valve stems or the like, comprising a housing having a bore therethrough, means for quickly detachably engaging a tire valve stem, a tubular member within said bore and axially movable therein, one end of said tubular member being formed for engagement with a hose and the other end with a packing for engagement with a tire valve stem, spring means between the housing and the tubular member urging the latter toward the tire valve stem engaging end of the housing, and a valve provided with a tire valve unseating means within said end of the tubular member seating against the packing therein and normally closing the passage therethrough.

2. A coupling for tire valve stems or the like, comprising a housing having a bore therethrough, means for quickly detachably engaging a tire valve stem, a tubular member within said bore and axially movable therein, one end of said tubular member being formed for engagement with a hose and the other end being provided with a packing for engagement with a tire valve stem, spring means between the housing and the tubular member urging the latter in the direction toward tire valve stem engaging end, and a spring-seated valve provided with a tire valve unseating means within said latter end of the tubular member normally closing the passage therethrough.

3. A coupling for a tire valve stem or the like, comprising a housing having a bore therethrough and a pair of spring-actuated jaws for engaging a tire valve stem, a tubular member axially movable within said bore, spring means between said housing and said tubular member urging the tire valve engaging end of the latter toward the end of the housing provided with the jaws, and means limiting the movement of said tubular member in that direction.

4. A coupling for a tire valve stem or the like, comprising a housing having a bore therethrough and a pair of manually-operable spring-actuated jaws for engaging a tire valve stem, a tubular member axially movable within said bore having at one end tire valve engaging means and a valve normally closing the passage through said tubular member, a packing within said tubular member against which the valve seats and which is adapted to form a seal with the end of the tire valve, spring means between said housing and said tubular member urging the tire valve engaging end of the latter toward the end of the housing provided with the jaws, and means limiting the movement of said tubular member in that direction.

5. A coupling for a tire valve stem or the like, comprising a housing having a bore therethrough and a pair of spring actuated jaws for engaging a tire valve stem, a tubular member axially movable within said bore having a packing for engaging the end of the tire valve stem and spring means between said housing and said tubular member urging the tire valve engaging end of the latter toward the end of the housing provided with the jaws.

In witness whereof, we have hereunto signed our names.

JOHN WAHL.
OTTO MELZER.